United States Patent
Saha et al.

(10) Patent No.: US 12,146,946 B2
(45) Date of Patent: Nov. 19, 2024

(54) UE FLIGHT PATH REPORTING

(71) Applicant: QUALCOMM Incorporated, San Diego, CA (US)

(72) Inventors: Chiranjib Saha, Blacksburg, VA (US); Alberto Rico Alvarino, San Diego, CA (US); Le Liu, Fremont, CA (US); Umesh Phuyal, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 17/353,078

(22) Filed: Jun. 21, 2021

(65) Prior Publication Data

US 2022/0404484 A1 Dec. 22, 2022

(51) Int. Cl.
*H04W 8/24* (2009.01)
*G01S 13/58* (2006.01)
*G01S 13/62* (2006.01)

(52) U.S. Cl.
CPC ............ *G01S 13/62* (2013.01); *G01S 13/584* (2013.01); *H04W 8/24* (2013.01)

(58) Field of Classification Search
CPC ........ H04L 67/303; H04L 67/12; H04W 4/42; H04W 8/24; H04W 4/029; G01S 13/584; G01S 13/62
See application file for complete search history.

(56) References Cited

U.S. PATENT DOCUMENTS

| | | |
|---|---|---|
| 2014/0207365 A1 | 7/2014 | Pereira |
| 2015/0323930 A1 | 11/2015 | Downey et al. |
| 2017/0358225 A1 | 12/2017 | Priest |

(Continued)

FOREIGN PATENT DOCUMENTS

| | | |
|---|---|---|
| CN | 110697037 A | 1/2020 |
| WO | 2019061140 A1 | 4/2019 |
| WO | 2019218114 A1 | 11/2019 |

OTHER PUBLICATIONS

Balampanis F., el., "Area Decomposition, Partition and Coverage with Multiple Remotely Piloted Aircraft Systems Operating in Coastal Regions", 2016 International Conference on Unmanned Aircraft Systems (ICUAS), IEEE, Jun. 7, 2016, XP032917970, pp. 275-283, Sections VI and VII.B, figure 8.

(Continued)

*Primary Examiner* — Congvan Tran
(74) *Attorney, Agent, or Firm* — SUNSTEIN LLP/Qualcomm

(57) ABSTRACT

A method for obtaining flight path information comprises: receiving, at a network entity, a capability report indicating a capability of a UE to report a flight path of the UE; and transmitting, from the network entity, a flight path report message that requests the UE to provide: partial-path reporting by reporting first flight path information indicative of a portion of the flight path of the UE that is less than all of the flight path; or triggered reporting by reporting second flight path information in response to occurrence of a trigger event, the second flight path information indicative of at least some of the flight path of the UE; or differential reporting by reporting third flight path information indicative of a difference between a present flight path of the UE and a previous flight path of the UE; or any combination thereof.

22 Claims, 9 Drawing Sheets

(56) References Cited

U.S. PATENT DOCUMENTS

| | | |
|---|---|---|
| 2018/0286252 A1 | 10/2018 | Park |
| 2020/0077415 A1 * | 3/2020 | Tang et al. |
| 2021/0021334 A1 * | 1/2021 | Tang .................... H04W 76/10 |
| 2021/0201685 A1 * | 7/2021 | Han .................... G08G 5/0039 |
| 2021/0345066 A1 * | 11/2021 | Hong .................... H04W 24/02 |

OTHER PUBLICATIONS

Huawei, et al., "Discussion on Flight Path Information", 3GPP TSG-RAN WG2 Meeting #101bis, R2-1805125, Introduction of Flight Path For Aerial Vehicles, 3rd Generation Partnership Project, Mobile Competence Centre, 650, Route Des Lucioles, F-06921 Sophia-Antipolis Cedex, vol. RAN WG2, No. Sanya, China, Apr. 16, 2018-Apr. 20, 2018, Apr. 14, 2018, 4 Pages, XP051428803, Sections 2.2 and 2.3.

International Search Report and Written Opinion—PCT/US2022/028509—ISA/EPO—Oct. 27, 2022.

Partial International Search Report—PCT/US2022/028509—ISA/EPO—Aug. 26, 2022.

Xiaomi Communications: "Discussion on the Procedure for the Flight Path Information Reporting", 3GPP Tsg- Ran WG2 Meeting #102, R2-1808685, 3rd Generation Partnership Project, Mobile Competence Centre, 650, Route Des Lucioles, F-06921, Sophia-Antipolis Cedex, France, vol. Ran WG2, No. Busan, Korea, 20180521-20180525, May 20, 2018, 2 Pages, XP051444925, Section 2.

* cited by examiner

1100

1110

Determining, at a user equipment (UE), a flight path report to provide:

partial-path reporting, wherein the flight path report contains first flight path information indicative of a portion of the UE flight path that is less than all of the UE flight path; or triggered reporting, wherein the method further comprises determining, at the UE, second flight path information for the flight path report in response to occurrence of a trigger event, the second flight path information indicative of at least some of the UE flight path; or differential flight path reporting, wherein the flight path report comprises third flight path information indicative of a difference between a present flight path of the UE and a previous flight path of the UE; or any combination thereof

1120

Transmitting, from the UE to a network entity, the flight path report

UE FLIGHT PATH REPORTING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example method for obtaining flight path information comprises: receiving, at a network entity from a user equipment (UE), a capability report indicating a capability of the UE to report a flight path of the UE to the network entity; and transmitting, from the network entity to the UE, a flight path report message that requests the UE to provide: partial-path flight path reporting by reporting, to the network entity, first flight path information indicative of a portion of the flight path of the UE that is less than all of the flight path; or triggered flight path reporting by reporting, to the network entity, second flight path information in response to occurrence of a trigger event, the second flight path information indicative of at least some of the flight path of the UE; or differential flight path reporting by reporting, to the network entity, third flight path information indicative of a difference between a present flight path of the UE and a previous flight path of the UE; or any combination thereof.

An example network entity comprises: a transceiver; a memory; and a processor communicatively coupled to the transceiver and the memory and configured to: receive, from a UE, a capability report indicating a capability of the UE to report a flight path of the UE to the network entity; and transmit, to the UE, a flight path report message that requests the UE to provide: partial-path flight path reporting by reporting, to the network entity, first flight path information indicative of a portion of the flight path of the UE that is less than all of the flight path; or triggered flight path reporting by reporting, to the network entity, second flight path information in response to occurrence of a trigger event, the second flight path information indicative of at least some of the flight path of the UE; or differential flight path reporting by reporting, to the network entity, third flight path information indicative of a difference between a present flight path of the UE and a previous flight path of the UE; or any combination thereof.

Another example network entity comprises: means for receiving, from a UE, a capability report indicating a capability of the UE to report a flight path of the UE to the network entity; and means for transmitting, to the UE, a flight path report message that requests the UE to provide: partial-path flight path reporting by reporting, to the network entity, first flight path information indicative of a portion of the flight path of the UE that is less than all of the flight path; or triggered flight path reporting by reporting, to the network entity, second flight path information in response to occurrence of a trigger event, the second flight path information indicative of at least some of the flight path of the UE; or differential flight path reporting by reporting, to the network entity, third flight path information indicative of a difference between a present flight path of the UE and a previous flight path of the UE; or any combination thereof.

An example non-transitory, processor-readable storage medium comprises processor-readable instructions to cause a processor of a network entity to: receive, from a UE, a capability report indicating a capability of the UE to report a flight path of the UE to the network entity; and transmit, to the UE, a flight path report message that requests the UE to provide: partial-path flight path reporting by reporting, to the network entity, first flight path information indicative of a portion of the flight path of the UE that is less than all of the flight path; or triggered flight path reporting by reporting, to the network entity, second flight path information in response to occurrence of a trigger event, the second flight path information indicative of at least some of the flight path of the UE; or differential flight path reporting by reporting, to the network entity, third flight path information indicative of a difference between a present flight path of the UE and a previous flight path of the UE; or any combination thereof.

An example communication method regarding a user equipment flight path comprises: determining, at a user equipment (UE), a flight path report to provide: partial-path flight path reporting, wherein the flight path report contains first flight path information indicative of a portion of the flight path of the UE that is less than all of the flight path of the UE; or triggered flight path reporting, wherein the method further comprises determining, at the UE, second flight path information for the flight path report in response to occurrence of a trigger event, the second flight path information indicative of at least some of the flight path of the UE; or differential flight path reporting, wherein the flight path report comprises third flight path information indicative of a difference between a present flight path of the UE and a previous flight path of the UE; or any combination thereof; and transmitting, from the UE to a network entity, the flight path report.

An example UE comprises: a transceiver; a memory; and a processor communicatively coupled to the transceiver and the memory and configured to: determine a flight path report to provide: partial-path flight path reporting, wherein the flight path report contains first flight path information indicative of a portion of the flight path of the UE that is less than all of the flight path of the UE; or triggered flight path reporting, the processor being configured to determine second flight path information for the flight path report in response to occurrence of a trigger event, the second flight path information indicative of at least some of the flight path of the UE; or differential flight path reporting, wherein the flight path report comprises third flight path information indicative of a difference between a present flight path of the UE and a previous flight path of the UE; or any combination thereof; and transmit, via the transceiver to a network entity, the flight path report.

Another example UE comprises: means for determining a flight path report to provide: partial-path flight path reporting, wherein the flight path report contains first flight path information indicative of a portion of the flight path of the UE that is less than all of the flight path of the UE; or triggered flight path reporting, wherein the means for determining the flight path report comprise means for determining second flight path information for the flight path report in response to occurrence of a trigger event, the second flight path information indicative of at least some of the flight path of the UE; or differential flight path reporting, wherein the flight path report comprises third flight path information indicative of a difference between a present flight path of the UE and a previous flight path of the UE; or any combination thereof; and means for transmitting, to a network entity, the flight path report.

Another example non-transitory, processor-readable storage medium comprises processor-readable instructions to cause a processor of a UE to: determine a flight path report to provide: partial-path flight path reporting, wherein the flight path report contains first flight path information indicative of a portion of the flight path of the UE that is less than all of the flight path of the UE; or triggered flight path reporting, wherein the processor-readable instructions to cause the processor to determine the flight path report comprise processor-readable instructions to cause the processor to determine second flight path information for the flight path report in response to occurrence of a trigger event, the second flight path information indicative of at least some of the flight path of the UE; or differential flight path reporting, wherein the flight path report comprises third flight path information indicative of a difference between a present flight path of the UE and a previous flight path of the UE; or any combination thereof; and transmit, to a network entity, the flight path report.

BRIEF DESCRIPTION OF THE DRAWINGS

FIG. 11 is a block flow diagram of a communication method regarding a user equipment flight path.

DETAILED DESCRIPTION

Figure 1:
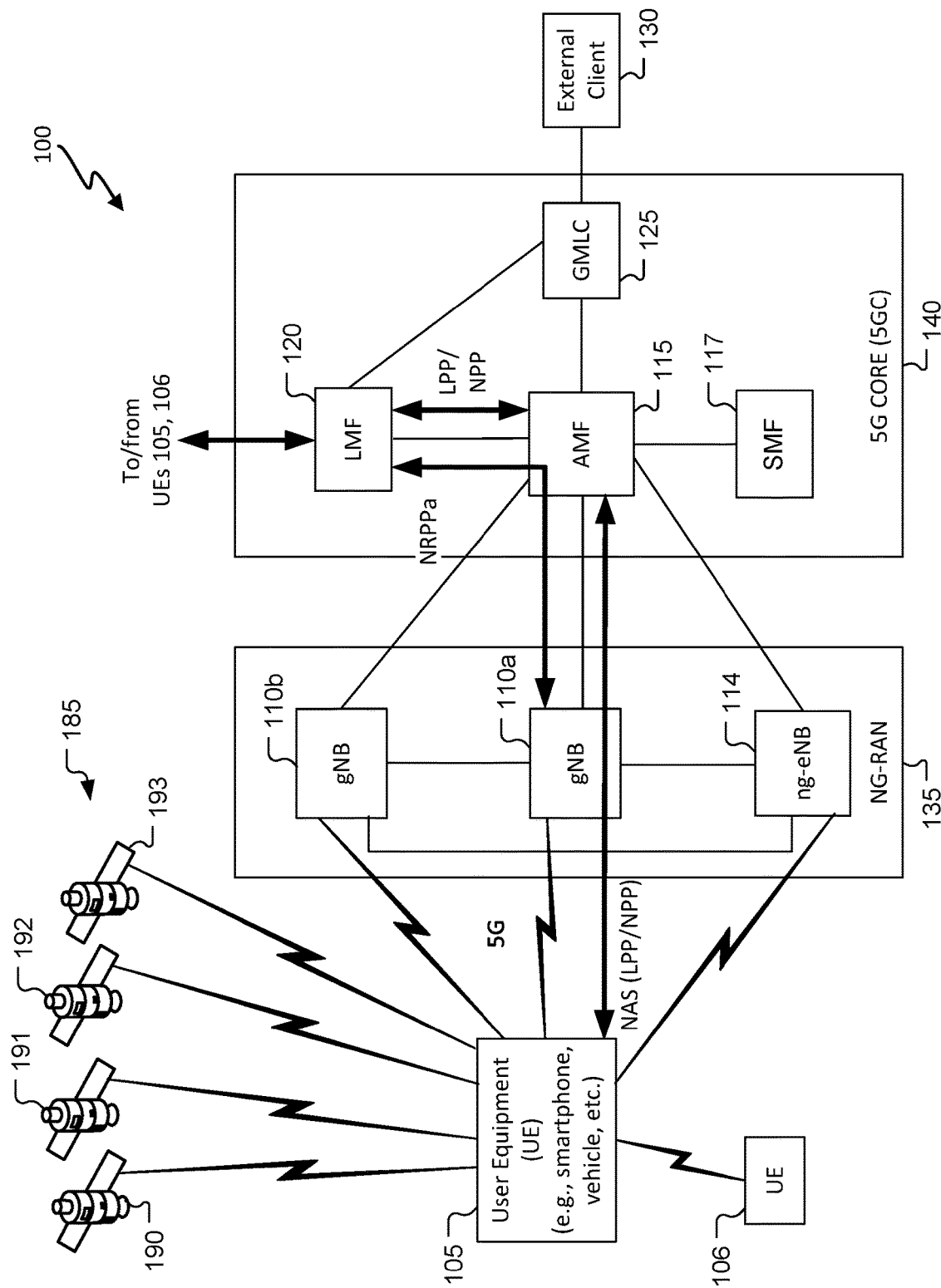
FIG. 1 is a simplified diagram of an example wireless communications system.

Techniques are discussed herein for requesting and/or obtaining flight path information of a user equipment (UE). For example, the UE may provide flight path information to one or more network entities such as a server and/or a base station. The network entity may request the UE to provide the flight path information. The flight path information may include waypoints each indicated by an ellipsoid, a polygon, or other shape. The UE may be requested to provide, and may provide, the flight path information indicating a portion of the flight path (less than the whole flight path), and/or to provide the flight path information in response to occurrence of a trigger event, and/or to provide the flight path information as differential information relative to previous flight path information. For example, the UE may provide differential flight path information as one or more waypoints each with a respective identifier and the network entity may add a waypoint to the previous flight path if the previous flight path lacked the corresponding identifier, and may modify waypoint information of the previous flight path if a waypoint with the corresponding identifier exists in the previous flight path. As another example, the UE may provide as differential information a waypoint identifier and a removal indication and the network entity may remove a waypoint, that has that identifier, from the previous flight path. These are examples, and other examples may be implemented.

Items and/or techniques described herein may provide one or more of the following capabilities, as well as other capabilities not mentioned. A server may be informed of a flight path from a UE and the server may use the flight path information to improve positioning accuracy for the UE and/or reduce latency of positioning for the UE. Communication traffic to provide flight path information may be regulated, e.g., by avoiding reporting updated flight path information unless a significant change in the flight path occurs, by reporting updated flight path information no more often than a threshold time, and/or by reporting changes to a flight path instead of the entire flight path. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
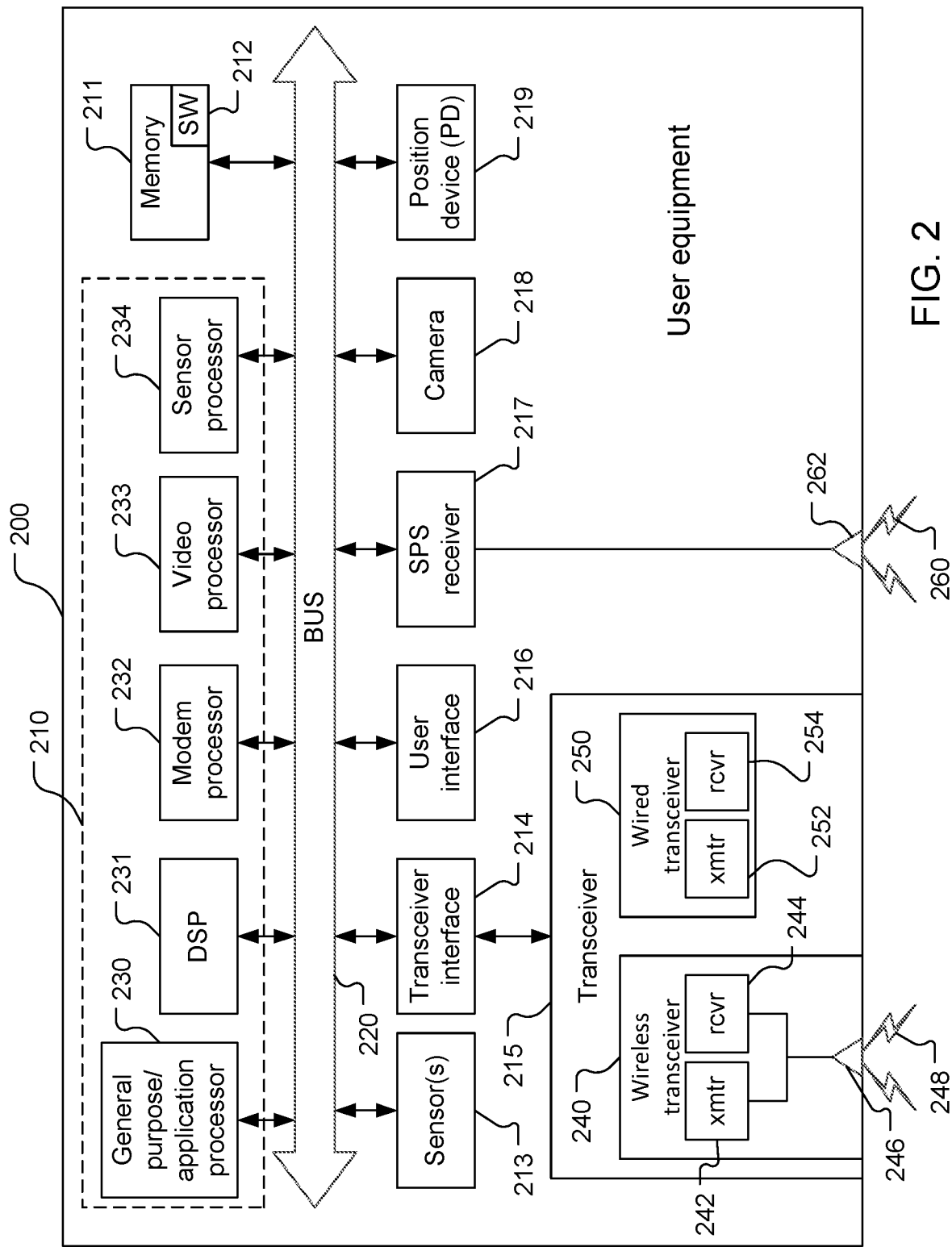
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identity, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
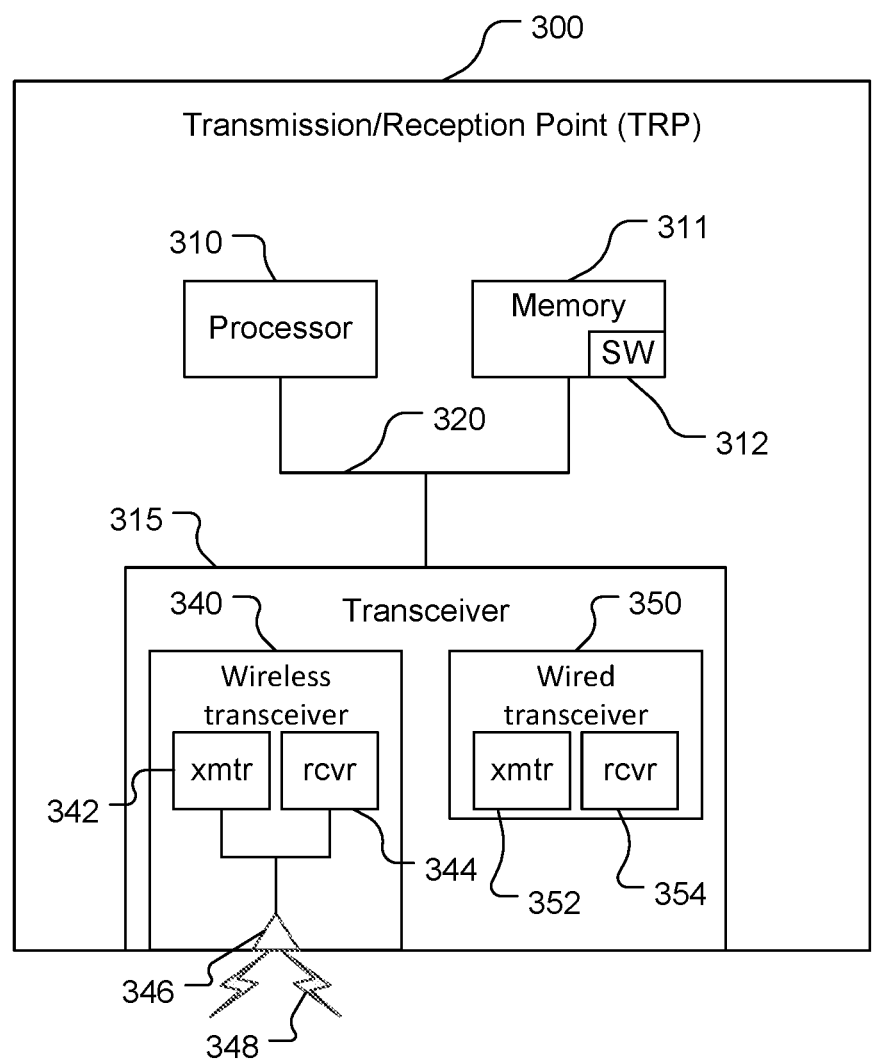
FIG. 3 is a block diagram of components of an example transmission/reception point.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
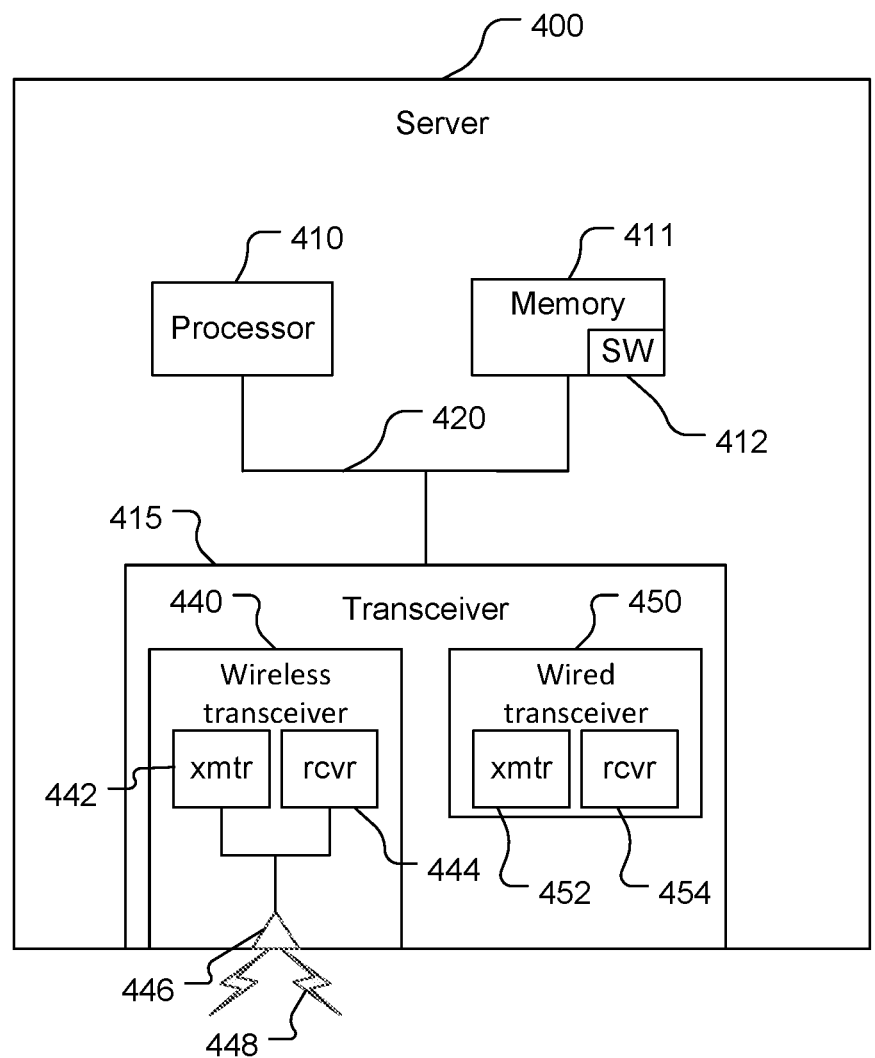
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource), can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell.

The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Flight Path Reporting

Figure 5:
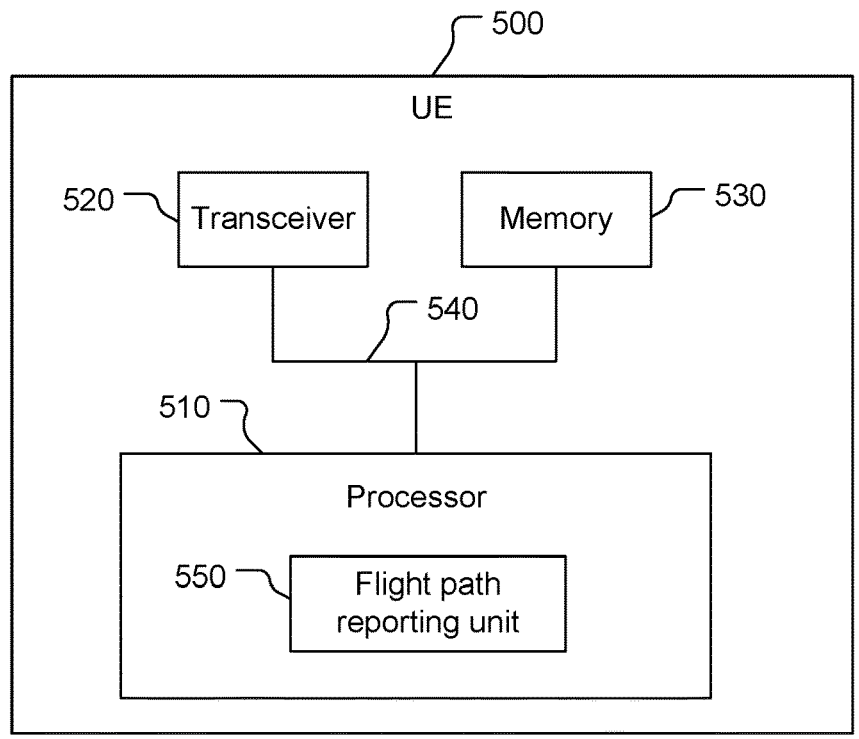
FIG. 5 is a block diagram of an example user equipment.

Referring also to FIG. 5, a UE 500 includes a processor 510, a transceiver 520, and a memory 530 communicatively coupled to each other by a bus 540. The UE 500 may include the components shown in FIG. 5. The UE 500 may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a flight path reporting unit 550. The flight path reporting unit 550 is discussed further below, and the description may refer to the processor 510 generally, or the UE 500 generally, as performing any of the functions of the flight path reporting unit 550.

Figure 6:
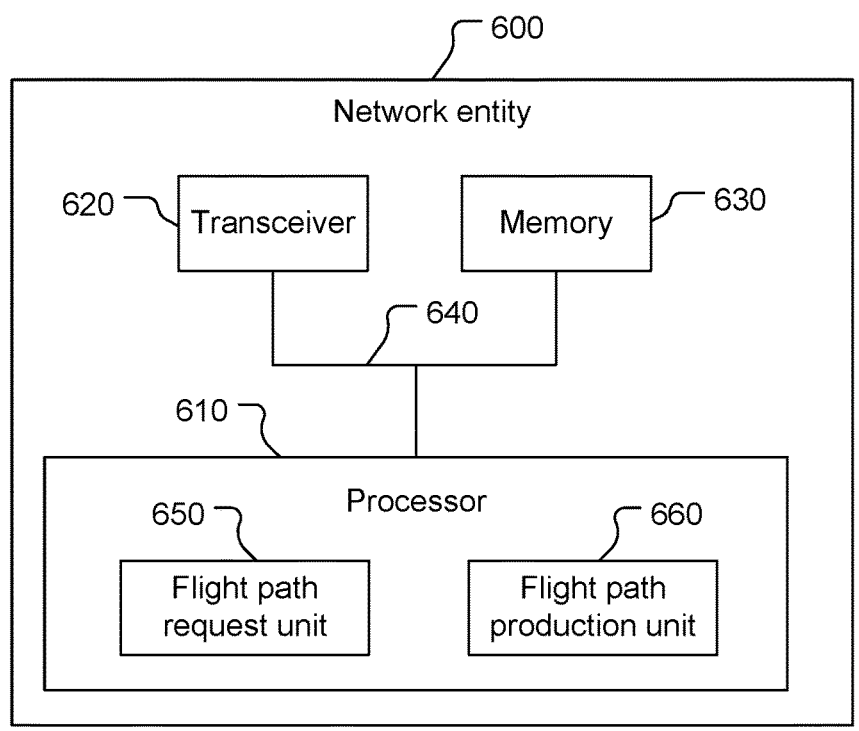
FIG. 6 is a block diagram of an example network entity.

Referring also to FIG. 6, a network entity 600 includes a processor 610, a transceiver 620, and a memory 630 communicatively coupled to each other by a bus 640. The network entity 600 may include the components shown in FIG. 6. The network entity 600 may include one or more other components such as any of those shown in FIG. 3 and/or FIG. 4 such that the TRP 300 and/or the server 400 may be an example of the network entity 600. For example, the processor 610 may include one or more of the components of the processor 310 and/or the processor 410. The transceiver 620 may include one or more of the components of the transceiver 315 and/or the transceiver 415. The memory 630 may be configured similarly to the memory 311 and/or the memory 411, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include a flight path request unit 650 and a flight path production unit 660. The flight path request unit 650 and the flight path production unit 660 are discussed further below, and the description may refer to the processor 610 generally, or the network entity 600 generally, as performing any of the functions of the flight path request unit 650 and/or the flight path production unit 660.

Figure 7:
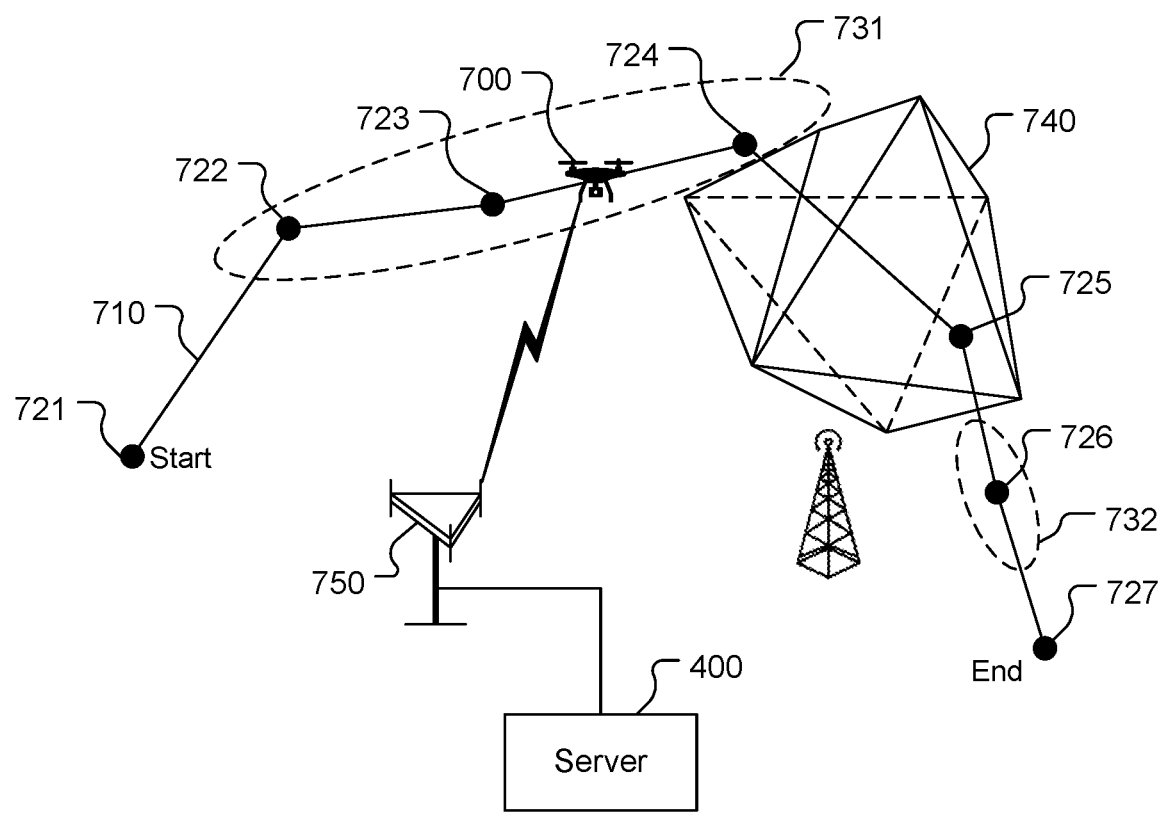
FIG. 7 is a simplified example of a user equipment flight path with waypoints indicated by an ellipsoids and a polygon.

Referring also to FIG. 7, a UE 700, which is an example of the UE 500 and in this example is a UAV (Unoccupied Aerial Vehicle), which may also be called a drone, has a flight path 710 comprising waypoints 721, 722, 723, 724, 725, 726, 727. The flight path 710 may be an actual flight path taken by the UE 700 or a scheduled flight path expected to be taken by the UE 700. The flight path 710 is a non-limiting example. A flight path may be formed by a curve fit, e.g., with lines (straight or non-straight, e.g., curved) connecting adjacent waypoints rather than all adjacent waypoints being connected by straight lines as shown in the example flight path 710. The waypoints 721-727 are shown as point locations, but waypoints may be described in one or more of a variety of ways such as point locations, two-dimensional areas, and/or three-dimensional shapes (e.g., ellipsoids (such as ellipsoids 731, 732), polygons (such as a polygon 740), etc.). For example, the flight path reporting unit 550 of the UE 700 may be configured to provide flight path information in accordance with the following pseudocode.

```
FlightPathInfoReport-r15 ::= SEQUENCE {
    flightPath-r15          SEQUENCE (SIZE(1..maxWayPoint-r15)) OF
    WayPointflightpath-r15 OPTIONAL,
    nonCriticalExtension    SEQUENCE { } OPTIONAL
}
WayPointflightpath-r15 ::= SEQUENCE {
    wayPointflightpath-r15 flightpathInfo-r10,
    timeStamp-r15           AbsoluteTimeInfo-r10 OPTIONAL
}
flightpathInfo-r10 ::= SEQUENCE {
    flightpathCoordinates-r10 CHOICE {
        ellipsoid-Point-r10                                 OCTET STRING (CONTAINING
        Ellipsoid-Point),
        ellipsoidPointWithAltitude-r10                      OCTET STRING (CONTAINING
        EllipsoidPointWithAltitude),
        ...,
        ellipsoidPointWithUncertaintyCircle-r11             OCTET STRING (CONTAINING
        Ellipsoid-
            PointWithUncertainty Circle),
        ellipsoidPointWithUncertaintyEllipse-r11            OCTET STRING (CONTAINING
            EllipsoidPointWithUncertaintyEllipse),
        ellipsoidPointWithAltitudeAndUncertaintyEllipsoid-r11 OCTET STRING (CONTAINING
            EllipsoidPointWithAltitudeAndUncertaintyEllipsoid),
        ellipsoidArc-r11                                    OCTET STRING (CONTAINING
        EllipsoidArc),
        polygon-r11                                         OCTET STRING (CONTAINING
        Polygon)
    },
    horizontalVelocity-r10 OCTET STRING (CONTAINING HorizontalVelocity) OPTIONAL,
    gnss-TOD-msec-r10 OCTET STRING (CONTAINING Gnss-TOD-msec) OPTIONAL,
    ...
}
```

Further, as indicated above, each waypoint has an associated timestamp. The UE 700 may send flight path information, e.g., descriptions of the waypoints, to the server 400 via a base station 750 comprising one or more of the TRPs 300. The server 400 may use the flight path information for accurate positioning of the UE 700. For example, the server 400 may use the flight path information as input to a filter (e.g., a Kalman filter) used to determine location estimate(s) of the UE 700 to help improve the accuracy of the location estimate(s).

Figure 8:
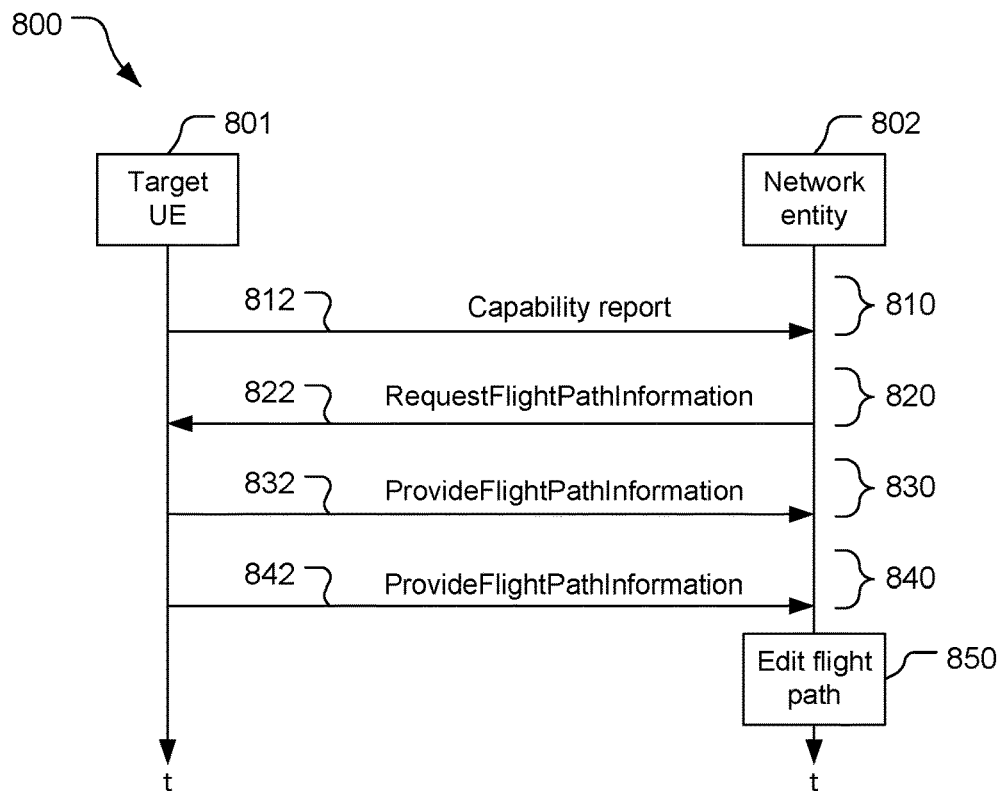
FIG. 8 is a signaling and process flow for providing flight path information.

Referring to FIG. 8, with further reference to FIGS. 1-7, a signaling and process flow 800 for network-initiated providing of flight path information from a target UE 801 to a network entity 802 includes the stages shown. The target UE 801 is the UE for which one or more location estimates are to be determined, and in this example is the UE 700. The flow 800 is an example only, as stages may be added, rearranged, and/or removed. For example, stage 850 may be omitted if non-differential flight path reporting is used. The flow 800 includes flight path information capability transfer, flight path information requesting, flight path information transfer, and flight path editing.

At stage 810, the target UE 801 transmits a capability report 812 to the network entity 802. The flight path reporting unit 550 of the target UE 801 may transmit the capability report 812 to the network entity 802 indicating that the target UE 801 supports reporting of flight path information to the network entity 802. The capability report 812 may indicate that the target UE 801 supports partial flight path reporting, triggered flight path reporting, and/or differential flight path reporting. The target UE 801 may be configured to transmit the capability report 812 in response to receiving a request for capabilities from the network entity 802 or without receiving a request for capabilities from the network entity 802. For example, flight-path related capabilities may be requested in, or added as non-critical extension of, an information element (IE) CommonIEsRequestCapabilities, and/or flight-path related capabilities may be provided in, or added as a non-critical extension of, an information element CommonIEsProvideCapabilities.

At stage 820, the network entity 802 transmits a flight path information request 822, here shown as an IE called RequestFlightPathInformation. If the network entity 802 is a server, then the request 822 may be an LPP message. If the network entity 802 is a TRP, then the request 822 may be an RRC (Radio Resource Control) message. The flight path information request 822 may configure the target UE 801 in one or more of a variety of ways to report flight path information, e.g., for the flight path 710. The target UE 801 may be statically configured (e.g., manufactured) to support one or more a variety of ways to report flight path information and the flight path information request 822 may indicate one or more such one or more ways to implement, and may provide one or more parameters to implement the indicated way(s). The flight path information request 822 may thus dynamically configure the target UE 801 to implement one or more supported static configurations. Also or alternatively, the flight path information request may dynamically configure the target UE 801 to implement flight path information reporting in a way not statically configured, e.g., by providing processor-readable instructions for the processor 510 to execute. The flight path information request 822 may, for example, request that the target UE 801 report the entire flight path 710 or to implement partial flight path reporting by reporting a portion of the flight path 710 that is less than the entire flight path 710. The flight path information request 822 may, as another example, request that the target UE 801 implement triggered flight path reporting to report flight path information in response to occurrence of a trigger event. The flight path information request 822 may, as another example, request that the target UE 801 implement differential reporting to report a difference between a present flight path and a previous flight path, i.e., one or more changes to the previous flight path. The present flight path includes the flight path based on the present location and previous locations of the target UE 801 and may include an updated expected path between the present location of the target UE 801 and a destination of the target UE 801. The flight path information request 822 may request that the target UE 801 implement a combination of these ways, e.g., partial and differential flight path reporting, partial and triggered flight path reporting, triggered and differential flight path reporting, or partial, triggered, and differential flight path reporting.

As an example of configuring the target UE 801 for partial flight path reporting, the network entity 802, e.g., the flight path request unit 650, may produce the request 822 to provide one or more spatial offsets and a temporal offset. For example, using Cartesian coordinates, the request 822 indicates x, y, and z coordinates of a reference location, indicates an x-offset $\Delta x$, a y-offset $\Delta y$, and/or a z-offset $\Delta z$, indicates a reference time t, and indicates a time offset $\Delta t$. The offsets may indicate to the target UE 801 to exclude any waypoint in the flight path 710 whose location is outside of a volume, around the reference location, defined by $x+/-\Delta x$, $y+/-\Delta y$ and $z+/-\Delta z$, or a timestamp beyond $t+/-\Delta t$. Alternatively, the temporal offset $\Delta t$ may indicate for the target UE 801 to exclude any waypoint whose timestamp is beyond $t+\Delta t$, and thus exclude any waypoint whose timestamp is before the indicated time t. The time t may be a present timestamp or another timestamp, e.g., a future time or a past time. As another alternative, a different value of $\Delta t$ may be used for either side of the time t, e.g., to indicate to exclude any waypoint whose timestamp is outside of $t-\Delta t_1$ and $t+\Delta t_2$, where $t_1 \neq t_2$. Still other examples are possible. For example, a volume may be defined in other ways (e.g., other coordinate systems), a volume may be defined in an irregular way (e.g., $x+\Delta x_1$, $x-\Delta x_2$ (where $\Delta x_1 \neq \Delta x_2$), etc.).

As another example of configuring the target UE 801 for partial flight path reporting, the network entity 802, e.g., the flight path request unit 650, may produce the request 822 to provide a quantity of waypoints not to be exceeded and a temporal offset. For example, the request 822 may indicate a quantity M and a time offset $\Delta t$ indicating to the target UE 801 to report no more than M waypoints in the flight path 710 having corresponding timestamps indicating times within $t+/-\Delta t$. Alternatively, the temporal offset $\Delta t$ may indicate for the target UE 801 to exclude any waypoint whose timestamp is beyond $t+\Delta t$, and thus exclude any waypoint whose timestamp is before the indicated time t. The time t may be a present timestamp or another timestamp, e.g., a future time or a past time. As another alternative, a different value of $\Delta t$ may be used for either side of the time t, e.g., to indicate to exclude any waypoint whose timestamp is outside of $t-\Delta t_1$ and $t+\Delta t_2$, where $t_1 \neq t_2$. Still other examples are possible.

As another example of configuring the target UE 801 for partial flight path reporting the network entity 802, e.g., the flight path request unit 650, may produce the request 822 to provide a quantity of waypoints not to be exceeded, without indicating a temporal offset. For example, the request 822 may indicate a quantity M indicating to the target UE 801 to report no more than M waypoints in the flight path 710, without regard to timestamps corresponding to the waypoints.

As another example of configuring the target UE 801 for partial flight path reporting, the network entity 802, e.g., the flight path request unit 650, may produce the request 822 to provide a reference time and a temporal offset. For example, the request 822 may indicate a time t and a time offset Δt, indicating to the target UE 801 to report no more any waypoints whose timestamp is within t+/−Δt regarding of how many waypoints that includes. Alternatively, the temporal offset Δt may indicate for the target UE 801 to exclude any waypoint whose timestamp is beyond t+Δt, and thus exclude any waypoint whose timestamp is before the indicated time t. The time t may be a present timestamp or another timestamp, e.g., a future time or a past time. As another alternative, a different value of Δt may be used for either side of the time t, e.g., to indicate to exclude any waypoint whose timestamp is outside of t−Δt$_1$ and t+Δt$_2$, where t$_1$≠t$_2$. Still other examples are possible.

The target UE 801 may be configured to implement more than one of these examples, and the request 822 may provide a coded indication of which example to implement. For example, partial flight path reporting with spatial and temporal constraints may be a first option, partial flight path reporting with waypoint quantity and temporal constraints may be a second option, partial flight path reporting with a waypoint quantity may be a third option, and partial flight path reporting with a temporal constraint may be a fourth option. In this case, the request may include a two-bit indication of which of the four options the target UE 801 should implement. The request 822, or another message, would include the respective parameter value(s) for the indicated (e.g., selected) option of partial flight path reporting.

The network entity 802 may request the target UE 801 to report a partial flight path for one or more of a variety of reasons. For example, the network entity 802 may know one or more mobility limitations of the target UE 801 (e.g., top speed, ability to change directions, etc.), and thus may limit the flight path reporting to waypoints that are possible within a time window. As another example, the network entity 802 may want to focus efforts for positioning of the target UE 801 to a region (which may be a volume) of interest, which may reduce processing by the network entity 802 to determine one or more location estimates for the target UE 801, saving energy and/or time and/or enabling more detailed processing by the network entity 802. This in turn may reduce latency and/or improve positioning accuracy. As another example, the network entity 802 may limit the flight path reported to waypoints that are relevant for a particular application, e.g., to limit the waypoints to a region relevant to a local business for advertising.

As an example of configuring the target UE 801 for triggered flight path reporting, the network entity 802, e.g., the flight path request unit 650, may produce the request 822 to provide one or more parameters defining an event to trigger flight path reporting. For example, the flight path request unit 650 may define a difference between a previous flight path (e.g., a flight path previously reported by the target UE 801) and a present flight path (e.g., an actual flight path being followed or an expected flight path that has been determined) that will trigger the target UE 801 to report flight path information. A previous (old) flight path, fp$_{old}$, may be defined as a sequence of P waypoints (optionally including timestamps) as $$fp_{old}=\{(x_1(i),y_1(i),z_1(i),t_1(i))\}, \text{ where } i=1,2,\ldots,P \quad (1)$$

and a present (new) flight path, fp$_{new}$, may be defined as a sequency of N waypoints (optionally including timestamps) as $$fp_{new}=\{(x_2(i),y_2(i),z_2(i),t_2(i))\}, \text{ where } i=1,2,\ldots,N \quad (2)$$

A spatial difference and a temporal difference between the old and new flight paths may be given by $$diff_{pos}(fp_1, fp_1) = \sum_{i=1}^{min(P,N)} \sqrt{w_x(x_1(i)-x_2(i))^2 + w_y(y_1(i)-y_2(i))^2 + w_z(z_1(i)-z_2(i))^2} \quad (3)$$

$$diff_{time}(fp_1, fp_1) = \sum_{i=1}^{min(P,N)} |t_1(i)-t_2(i)| \quad (4)$$

where w$_x$, w$_y$, and w$_z$ are weighting factors provided by the flight path request unit 650 of the network entity 802. The weighting factors may be used, for example, to weight an altitude deviation more significantly than horizontal deviations between the flight paths. A trigger event may be defined as the spatial difference exceeding a spatial threshold or the temporal difference exceeding a time threshold, that is, $$diff_{pos}(fp_1,fp_1)>\Delta_{position} \quad (5)$$

or $$diff_{time}(fp_1,fp_1)>\Delta_{time} \quad (6)$$

The network entity 802 may provide the threshold value(s) diff$_{pos}$, diff$_{time}$. Other trigger events may be defined. For example, a trigger event may be defined for a difference between individual waypoints. As another example, a trigger event may be defined as a deviation in one direction alone (e.g., altitude). Trigger events may include deviations from expectation and/or anomalies. A trigger event may be indicative of evasive behavior such as avoiding an obstruction, avoiding a reference location, etc.

The flight path information request 822 may indicate one or more limitations on triggered flight path reporting by the target UE 801. For example, the request 822 may indicate an expiration time at which, or duration after which, the target UE 801 is to terminate the triggered flight path reporting. The request 822 may indicate that there is no expiration for the triggered flight path reporting, e.g., indicating a value of 0 for the duration. The target UE 801 may be statically configured to implement a default time window for triggered flight path reporting, e.g., starting triggered flight path reporting upon receipt of the flight path information request 822 and terminating the triggered flight path reporting upon passage of the default duration since starting the triggered flight path reporting. As another example, the flight path information request 822 may indicate a prohibit-report timer indicating a threshold amount of time after flight path information is reported by the target UE 801 before the target UE 801 can report flight path information again. Implementing this threshold time between flight path information reports may reduce communication overhead and reduce processing by both the target UE 801 and the network entity 802, saving energy.

As an example of configuring the target UE 801 for differential flight path reporting, the network entity 802, e.g., the flight path request unit 650, may produce the request 822 to request or enable the target UE 801 to perform differential reporting of the flight path. In differential reporting, the difference(s) between a previous flight path (e.g., a previously-reported or otherwise previously-determined flight path) and a present flight path is(are) reported, without reporting the entire present flight path. In this way, communication overhead may be conserved (reduced relative to transmitting the entire present flight path) and latency reduced (by not processing the entire flight path to use the flight path for positioning of the target UE 801). A previous flight path may be an expected flight path of the target UE 801, e.g., with the expected flight path reported/stored before the target UE 801 departs. This flight path may be updated due to deviations from the expected flight path, or verified based on the target UE 801 being at expected waypoints at corresponding expected times.

At stage 830, the target UE 801, e.g., the flight path reporting unit 550, transmits flight path information 832 to the network entity 802. The flight path reporting unit 550 of the target UE 801 is configured to report flight path information for the flight path 710, e.g., based on the indicated way of reporting indicated in the flight path information request 822 and using the respective parameter(s) provided by the network entity 802 for the indicated way. For example, for triggered flight path reporting, the target UE 801 may monitor for triggering events for a time span indicated by the flight path information request 822, thus enabling triggered flight path reporting for the indicated time span. The flight path information 832 may be transmitted in a ProvideFlightPathInformation IE. The flight path information 832 may include one or more waypoints (e.g., all the waypoints, a portion of the waypoints defined by the flight path information request 822, the waypoint(s) constituting a difference between a present and a previous flight path, etc.). The flight path information 832 transferred may match or be a subset of the flight path information requested by the flight path information request 822, although the network entity 802 may allow additional flight path information to be transferred, which may be transferred at stage 840. If stage 840 does not occur, then the flight path information 832 may terminate the flight path information transfer, e.g., by setting an endTransaction IE to TRUE.

At stage 840, if requested by the flight path information request 822, the target UE 801 transmits further flight path information 842, e.g., in another ProvideFlightPathInformation IE. The further flight path information 842 may match or be a subset of the flight path information requested by the flight path information request 822 unless the network entity allows additional flight path information that the network entity 802 may use to confirm location of the target UE 801 and/or to improve a location estimate for the target UE 801. For example, the additional information may include uncertainties associated with the waypoints and/or UE velocities associated with the waypoints (e.g., expected and/or actual velocities at the waypoints). The last message of the further flight path information 842 terminates the flight path information transfer, e.g., by including an endTransaction IE set to TRUE.

The flight path information 832, 842 may be transmitted by the target UE 801 in response to the flight path information request 822 from the network entity 802. If the network entity 802 is a server, then the flight path information 832, 842 may be transmitted as LPP messages. For example, with the network entity 802 being a server, upon receiving a RequestFlightPathInformation message, the target UE 801 may: (1) if the requested information is compatible with the capabilities and configuration of the target UE 801, include the requested information in a ProvideFlightPathInformation message, set an LPP-TransactionID IE in the response to the same value as an LPP-TransactionID in the received message, and deliver the ProvideFlightPathInformation message to lower layers (than where the flight path information is determined) for transmission; and (2) otherwise, handle the signaling content by LPP error detection. If the network entity 802 is a TRP, then the flight path information 832, 842 may be transmitted as RRC messages, e.g., similar to the LPP messages discussed.

The flight path information 832, 842 may be transmitted by the target UE 801 in response to occurrence of a trigger event. For example, when triggered to transmit a ProvideFlightPathInformation message, the target UE 801 may set a corresponding IE to include available flight path information and deliver the response to lower layers (than where the flight path information is determined) for transmission.

At stage 850, the network entity 802 may edit a flight path. The network entity 802, e.g., the flight path production unit 660, may generate a new flight path using received waypoint information for a flight path not previously produced or received, and may edit an existing flight path by adding one or more new waypoints, revising information for one or more waypoints, and/or removing one or more waypoints based on information in the flight path information 832, 842. Editing of the flight path is discussed further below.

Figure 9:
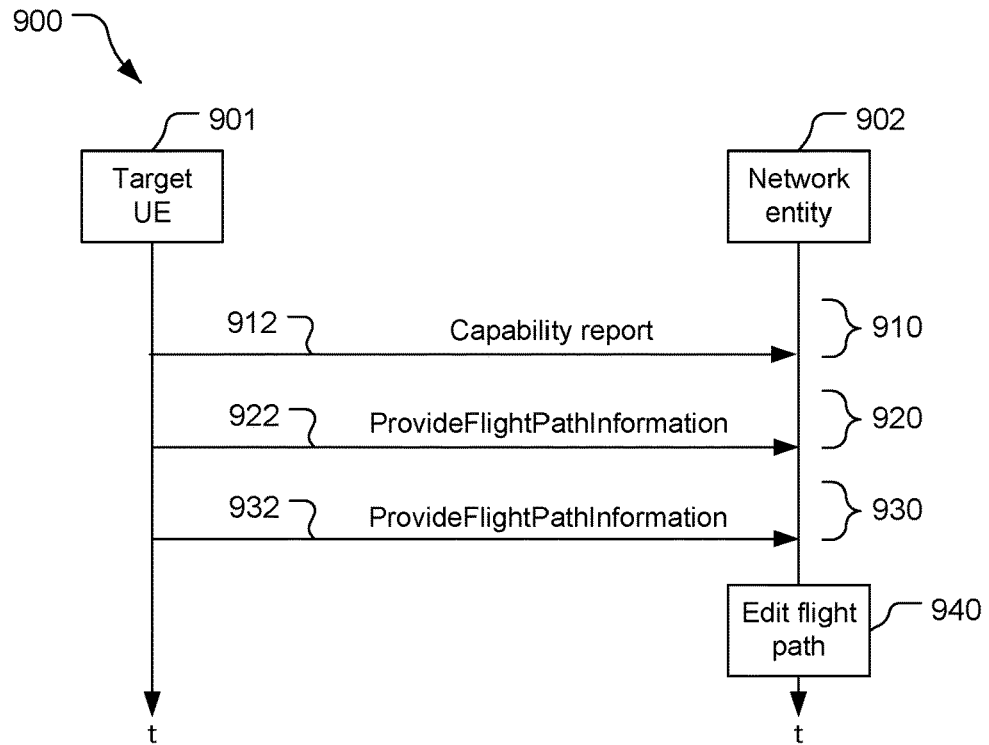
FIG. 9 is another signaling and process flow for providing flight path information.

Referring also to FIG. 9, a signaling and process flow 900 for UE-initiated providing of flight path information from a target UE 901 to a network entity 902 includes the stages shown. The flow 900 includes stages similar to the flow 800. At stage 910, the target UE 901 may send a capability report 912 to the network entity 902 without being requested by the network entity 902 to provide capabilities of the target UE 901. At stages 920, 930, the target UE 901 may provide flight path information 922, 932, similar to the flight path information 832, 842, but without being requested to provide flight path information by the network entity 902. For example, the target UE 901 may provide partial-path flight path information according to one or more parameters stored by the target UE 901, and/or may provide triggered flight path reporting according to one or more parameters (e.g., defining a trigger event) stored by the target UE 901. At stage 940, the network entity 902 may edit flight path information similar to the network entity 802 at stage 850.

The target UE 801, 901 (e.g., the respective flight path reporting unit 550) may be configured to provide the flight path information 832, 922 in a variety of formats. For example, the target UE 801, 901 may be configured to provide the flight path information 832, 922 in accordance with the pseudocode discussed above with respect to FIG. 7. As another example, for differential flight path reporting, the target UE 801, 901 may be configured to provide the flight path information 832, 922 according to the following pseudocode.

```
ProvideFlightPathInformation ::= SEQUENCE{
    flightpathinforeport FlightPathInfoReport-r15
    ...
}
where the FlightPathInfoReport may be defined as
FlightPathInfoReport-rXX ::= SEQUENCE {
```

```
flightPath         SEQUENCE (SIZE(1..maxWayPoint-rXX)) OF
WayPointFlightPath-rXX        OPTIONAL,
flightPathToAddModList SEQUENCE (SIZE(1..maxWayPoint-rXX)) OF
WayPointflightpath-rXX   OPTIONAL,
flightPathToReleaseList SEQUENCE (SIZE(1..maxWayPoint-rXX)) OF WayPointflightpath-
   rXX-Id OPTIONAL,
}
and
    WayPointFlightPath-rXX ::= SEQUENCE {
       wayPointFlightPathID-rxx,
       wayPointflightpath-r15 LocationInfo-r10,
       timeStamp-r15      AbsoluteTimeInfo-r10 OPTIONAL
    }
    WayPointFlightPathID-rxx ::= INTEGER (1..maxWayPointFlightPathID-rxx)
```

Thus, the flight path information 832, 922 may include a full or partial flight path comprising one or more waypoints, with each waypoint including a waypoint ID, a location, and a timestamp. The waypoint ID provides a unique identity for a particular waypoint of a particular flight path. The flight path information 832, 922 may also or alternatively include one or more waypoints to be added to (if not yet existing), one or more waypoints to be modified (if already existing in a flight path), and/or one or more waypoint IDs of one or more waypoints to be removed from a flight path stored by the network entity 802, 902 (e.g., as an array of waypoint IDs and waypoint information (e.g., location, ellipsoid, polygon, etc.)). The flightPathToAddModList, if included, includes one or more waypoints. For each waypoint in the flightPathToAddModList, if the waypoint ID exists in a flight path stored by the network entity 802, 902, then the network entity 802, 902 (e.g., the flight path production unit 660) modifies the waypoint information for the waypoint with the waypoint information provided in the flight path information 832, 922. For each waypoint in the flightPathToAddModList, if the waypoint ID does not exist in a flight path stored by the network entity 802, 902, then the network entity 802, 902 (e.g., the flight path production unit 660) adds the waypoint information in the flight path information 832, 922 to the flight path. The flightPathToReleaseList, if included, includes one or more waypoint IDs. For each waypoint ID in the flightPathToReleaseList, the network entity 802, 902 (e.g., the flight path production unit 660) removes the waypoint information (if any) for that waypoint ID from the flight path stored by the network entity 802, 902.

Referring again to stages 850, 940, the network entity 802, 902, e.g., the flight path production unit 660, may be configured to produce a flight path based on whether the flight path information 832, 922 includes a release indication or a modification/add indication. The flight path production unit 660 may be configured to respond to the flight path information 832, 922 including a release indication, e.g., the flightPathToReleaseList, by releasing each waypoint that is in the present flight path and whose waypoint ID is included in the flightPathToReleaseList, thus removing the waypoint(s) from the flight path. Also, the flight path production unit 660 may be configured to respond to the flight path information 832, 922 including an add/modify indication, e.g., the flightPathToAddModList, by adding each waypoint, if any, whose waypoint ID is included in the flightPathToAddModList but is not in the present flight path, thus changing the present flight path to include the waypoint(s) that were not in the flight path but were in the add/modify indication. Also, the flight path production unit 660 may be configured to respond to the flight path information 832, 922 including the add/modify indication by modifying each waypoint, if any, whose waypoint ID is included in the flightPathToAddModList and is in the present flight path, thus reconfiguring the present flight path to include the waypoint information, if any, that corresponds to a waypoint in the present flight path and that was not in the flight path but is in the add/modify indication.

Figure 10:
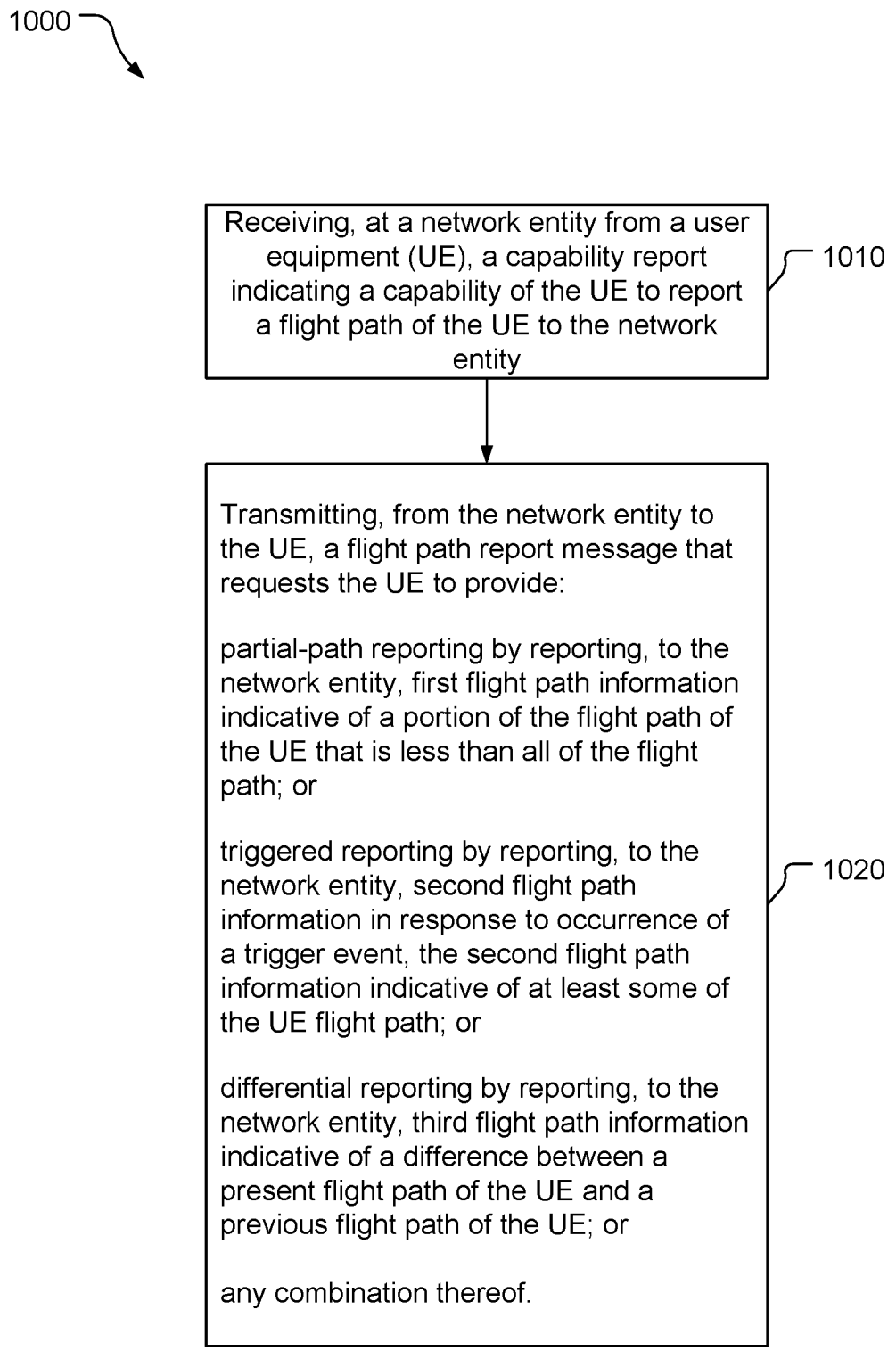
FIG. 10 is a block flow diagram of a method of obtaining flight path information.

Referring to FIG. 10, with further reference to FIGS. 1-9, a method 1000 for obtaining flight path information includes the stages shown. The method 1000 is, however, an example only and not limiting. The method 1000 may be altered, e.g., by having stages added, removed, rearranged, combined, performed concurrently, and/or having single stages split into multiple stages.

At stage 1010, the method 1000 includes receiving, at a network entity from a user equipment (UE), a capability report indicating a capability of the UE to report a flight path of the UE to the network entity. For example, the network entity 802 receives the capability report 812 from the target UE 801. The processor 610, possibly in combination with the memory 630, in combination with the transceiver 620 (e.g., the wireless receiver 344 and the antenna 346, or the wired receiver 354, or the wireless receiver 444 and the antenna 446, or the wired receiver 454) may comprise means for receiving the capability report.

At stage 1020, the method 1000 includes transmitting, from the network entity to the UE, a flight path report message that requests the UE to provide: partial-path flight path reporting by reporting, to the network entity, first flight path information indicative of a portion of the flight path of the UE that is less than all of the flight path; or triggered flight path reporting by reporting, to the network entity, second flight path information in response to occurrence of a trigger event, the second flight path information indicative of at least some of the flight path of the UE; or differential reporting by reporting, to the network entity, third flight path information indicative of a difference between a present flight path of the UE and a previous flight path of the UE; or any combination thereof. For example, the network entity 802 transmits the flight path information request 822 to the target UE 801 requesting partial-path flight path reporting, triggered flight path reporting, and/or differential flight path reporting. The processor 610, possibly in combination with the memory 630, in combination with the transceiver 620 (e.g., the wireless transmitter 342 and the antenna 346, or the wired transmitter 352, or the wireless transmitter 442 and the antenna 446, or the wired transmitter 452) may comprise means for transmitting the flight path report message.

Implementations of the method 1000 may include one or more of the following features. In an example implementation, the flight path report message requests the UE to provide the partial-path flight path reporting, the flight path report message including at least one criterion for waypoints of the portion of the flight path. For example, the flight path information request 822 may indicate one or more parameters to be met for partial path flight path reporting. In another example implementation, the at least one criterion comprises: a first time window and one or more location ranges; or a second time window and a first quantity limit of the waypoints of the portion of the flight path; or a second quantity limit of the waypoints of the portion of the flight path. The one or more parameters to be met may include a time span (e.g., a reference time and a time window relative to the reference time) and one or more spatial constraints (e.g., one or more coordinate restraints relative to one or more reference coordinates) for waypoints to meet in order to be reported. Alternatively, the one or more parameters to be met may include a time span and a limit on the number of waypoints to be reported. Alternatively, the one or more parameters to be met may include a limit on the number of waypoints to be reported, e.g., without a time span parameter (and possibly without any other constraint).

Also or alternatively, implementations of the method 1000 may include one or more of the following features. In an example implementation, the flight path report message requests the UE to provide the triggered flight path reporting, the flight path report message including at least one criterion for the trigger event. For example, the flight path information request 822 may indicate one or more event parameters to be met for triggered flight path reporting. In another example implementation, the at least one criterion for the trigger event comprises a time window for the trigger event to occur, or a threshold separation time between a plurality of trigger events occurring for the UE to report the second flight path information in response to each of the plurality of trigger events, or a combination thereof. For example, the one or more event parameters may define a time during which triggered flight path reporting is enabled and/or an amount of time after a triggered report is sent before another triggered report can be sent. In another example implementation, the at least one criterion comprises: one or more differential distance weighting factors for weighting one or more differences in respective coordinate system values between first waypoints of the previous flight path of the UE and second waypoints of the present flight path of the UE; or a distance differential threshold for a sum of distance differences between the first waypoints and the second waypoints; or a time differential threshold for a sum of time differences between the first waypoints and the second waypoints; or any combination thereof. For example, the one or more event parameters may define one or more spatial weights for coordinate system coordinate differences between waypoints in a previous flight path and a present flight path, a spatial threshold for a spatial difference between the flight paths, and/or a time threshold for a time difference between the flight paths, for example as discussed above with respect to Equations (1)-(6).

Also or alternatively, implementations of the method 1000 may include one or more of the following features. In an example implementation, the flight path report message requests the UE to provide the differential reporting, and the method further comprises: receiving, by the network entity from the UE, the third flight path information; and either storing, by the network entity, first waypoint information from the third flight path information to a stored flight path based on the third flight path information including the first waypoint information and a first waypoint identity; or removing, by the network entity, second waypoint information from the stored flight path based on the third flight path information indicating to release a second waypoint identity that is present in the stored flight path, the second waypoint information corresponding to the second waypoint identity. For example, the network entity 802 (e.g., the flight path production unit 660) may store (e.g., add a waypoint to a flight path or modify a waypoint of a flight path) based on the flight path information 832 indicating to add or modify a previous flight path with provided waypoint information, and/or the network entity 802 may remove a waypoint from the previous flight path based on the flight path information 832 indicating to release a waypoint with a waypoint ID provided in the flight path information 832. The flight path information 832 may include one or more indications to add a waypoint, one or more indications to modify a waypoint, and/or one or more indications to release a waypoint. The processor 610, in combination with the memory 630, may comprise means for storing the first waypoint information and/or means for removing the second waypoint information.

Referring to FIG. 11, with further reference to FIGS. 1-9, a communication method 1100 regarding a user equipment flight path includes the stages shown. The method 1100 is, however, an example only and not limiting. The method 1100 may be altered, e.g., by having stages added, removed, rearranged, combined, performed concurrently, and/or having single stages split into multiple stages.

At stage 1110, the method 1100 includes determining, at a user equipment (UE), a flight path report to provide: partial-path flight path reporting, wherein the flight path report contains first flight path information indicative of a portion of the flight path of the UE that is less than all of the flight path of the UE; or triggered flight path reporting, wherein the method further comprises determining, at the UE, second flight path information for the flight path report in response to occurrence of a trigger event, the second flight path information indicative of at least some of the flight path of the UE; or differential flight path reporting, wherein the flight path report comprises third flight path information indicative of a difference between a present flight path of the UE and a previous flight path of the UE; or any combination thereof. For example, the target UE 801, 901 (e.g., the flight path reporting unit 550) determines the flight path information 832, 922 (e.g., a partial or a full flight path, possibly in response to occurrence of a trigger event, and/or in terms of differential flight path information (e.g., between a previous (e.g., previously-reported) flight path and a present flight path). The processor 510, possibly in combination with the memory 530, may comprise means for determining the flight path report.

At stage 1120, the method 1100 includes transmitting, from the UE to a network entity, the flight path report. For example, the target UE 801, 901 transmits the flight path information 832, 922 to the network entity 802, 902 (e.g., the TRP 300 and/or the server 400). The processor 510, possibly in combination with the memory 530, in combination with the transceiver 520 (e.g., the wireless transmitter 242 and the antenna 346) may comprise means for transmitting the flight path report.

Implementations of the method 1100 may include one or more of the following features. In an example implementation, the flight path report provides the partial-path flight path reporting, and the flight path report includes waypoint information for at least one waypoint of the flight path of the UE that satisfies at least one partial-path criterion. For example, the flight path information 832 includes a portion of the flight path, e.g., the flight path 710, based on one or more parameters (e.g., received from the network entity 802

(e.g., in the flight path information request 822) or stored in the target UE 801, 901). In another example implementation, the at least one partial-path criterion comprises: a first time window and one or more location ranges; or a second time window and a first waypoint quantity limit of the portion of the flight path; or a second waypoint quantity limit of the portion of the flight path. For example, the one or more parameters may limit the partial-path flight path reporting to reporting waypoints with locations within one or more spatial bounds and timestamps within a time bound, or to reporting a threshold number of waypoints or fewer each with a timestamp within a time bound, or to reporting a threshold number of waypoints (e.g., regardless of timestamp).

Also or alternatively, implementations of the method 1100 may include one or more of the following features. In an example implementation, the flight path report provides the triggered flight path reporting, and the method further comprises obtaining, at the UE, at least one event criterion for the trigger event. For example, the target UE 801 may receive, from the network entity 802 (e.g., in the flight path information request 822) one or more event parameters defining a triggering event for reporting flight path information and/or may read one or more event parameters from the memory 530 of the target UE 801. As another example, the target UE 901 may read one or more event parameters from the memory 530 of the target UE 901. The processor 510, possibly in combination with the memory 530, possibly in combination with the transceiver 520 (e.g., the wireless receiver 244 and the antenna 246) may comprise means for obtaining the at least one event criterion. In another example implementation, the at least one event criterion for the trigger event comprises a time window for the trigger event to occur, or a threshold separation time between a plurality of trigger events occurring for the UE to report the second flight path information in response to each of the plurality of trigger events, or a combination thereof. For example, the one or more event parameters may define a window of time over which triggered flight path reporting is enabled and/or a threshold time between consecutive trigger events to induce triggered flight path reports. A threshold time may be provided for separation between consecutive triggered flight path reports (i.e., when the triggered flight path reports are reported). In another example implementation, the at least one event criterion for the trigger event comprises: one or more differential distance weighting factors for weighting one or more differences in respective coordinate system values between first waypoints of the previous flight path of the UE and second waypoints of the present flight path of the UE; or a distance differential threshold for a sum of distance differences between the first waypoints and the second waypoints; or a time differential threshold for a sum of time differences between the first waypoints and the second waypoints; or any combination thereof. For example, the one or more event parameters may comprise one or more of the weighting factors and/or the spatial threshold and/or the temporal threshold as discussed above with respect to Equations (1)-(6).

Also or alternatively, implementations of the method 1100 may include one or more of the following features. In an example implementation, the flight path report provides the differential flight path reporting, and the third flight path information comprises waypoint information for at least one waypoint, the waypoint information for each of the at least one waypoint comprising a waypoint identity. For example, the flight path information 832, 922 may include one or more waypoint IDs corresponding to respective waypoint information (e.g., location, volume definition (e.g., ellipsoid, polygon, etc.). In another example implementation, the flight path report includes waypoint information for each of at least one waypoint of the flight path of the UE, and for each of the at least one waypoint the waypoint information comprises an indication of an ellipsoid, or an indication of a polygon, or a combination thereof. In another example implementation, the method 1100 includes transmitting, from the UE to the network entity, a capability report indicating a capability of the UE to provide at least one of the partial-path flight path reporting, the triggered flight path reporting, or the differential flight path reporting. For example, the target UE 801 (e.g., the flight path reporting unit 550) may transmit the capability report 812 indicating that the target UE 801 can provide partial-path flight path reporting and/or indicating that the target UE 801 can provide triggered flight path reporting and/or that the target UE 801 can provide differential flight path reporting. The processor 510, possibly in combination with the memory 530, possibly in combination with the transceiver 520 (e.g., the wireless transmitter 242 and the antenna 246) may comprise means for transmitting the capability report.

Implementation Examples

Implementation examples are provided in the following numbered clauses.

1. A method for obtaining flight path information, the method comprising:
   receiving, at a network entity from a user equipment (UE), a capability report indicating a capability of the UE to report a flight path of the UE to the network entity; and
   transmitting, from the network entity to the UE, a flight path report message that requests the UE to provide:
   partial-path flight path reporting by reporting, to the network entity, first flight path information indicative of a portion of the flight path of the UE that is less than all of the flight path; or
   triggered flight path reporting by reporting, to the network entity, second flight path information in response to occurrence of a trigger event, the second flight path information indicative of at least some of the flight path of the UE; or
   differential flight path reporting by reporting, to the network entity, third flight path information indicative of a difference between a present flight path of the UE and a previous flight path of the UE; or
   any combination thereof.
2. The method of clause 1, wherein the flight path report message requests the UE to provide the partial-path flight path reporting, the flight path report message including at least one criterion for waypoints of the portion of the flight path.
3. The method of clause 2, wherein the at least one criterion comprises:
   a first time window and one or more location ranges; or
   a second time window and a first quantity limit of the waypoints of the portion of the flight path; or
   a second quantity limit of the waypoints of the portion of the flight path.
4. The method of clause 1, wherein the flight path report message requests the UE to provide the triggered flight path reporting, the flight path report message including at least one criterion for the trigger event.
5. The method of clause 4, wherein the at least one criterion for the trigger event comprises a time window for the trigger event to occur, or a threshold separation time between a plurality of trigger events occurring for the UE to report the second flight path information in response to each of the plurality of trigger events, or a combination thereof.

6. The method of clause 4, wherein the at least one criterion comprises:
one or more differential distance weighting factors for weighting one or more differences in respective coordinate system values between first waypoints of the previous flight path of the UE and second waypoints of the present flight path of the UE; or
a distance differential threshold for a sum of distance differences between the first waypoints and the second waypoints; or
a time differential threshold for a sum of time differences between the first waypoints and the second waypoints; or
any combination thereof.

7. The method of clause 1, wherein the flight path report message requests the UE to provide the differential flight path reporting, and wherein the method further comprises:
receiving, by the network entity from the UE, the third flight path information; and
at least one of:
storing, by the network entity, first waypoint information from the third flight path information to a stored flight path based on the third flight path information including the first waypoint information and a first waypoint identity; or
removing, by the network entity, second waypoint information from the stored flight path based on the third flight path information indicating to release a second waypoint identity that is present in the stored flight path, the second waypoint information corresponding to the second waypoint identity.

8. A network entity comprising:
a transceiver;
a memory; and
a processor communicatively coupled to the transceiver and the memory and configured to:
receive, from a user equipment (UE), a capability report indicating a capability of the UE to report a flight path of the UE to the network entity; and
transmit, to the UE, a flight path report message that requests the UE to provide:
partial-path flight path reporting by reporting, to the network entity, first flight path information indicative of a portion of the flight path of the UE that is less than all of the flight path; or
triggered flight path reporting by reporting, to the network entity, second flight path information in response to occurrence of a trigger event, the second flight path information indicative of at least some of the flight path of the UE; or
differential flight path reporting by reporting, to the network entity, third flight path information indicative of a difference between a present flight path of the UE and a previous flight path of the UE; or
any combination thereof.

9. The network entity of clause 8, wherein the flight path report message requests the UE to provide the partial-path flight path reporting, the flight path report message including at least one criterion for waypoints of the portion of the flight path.

10. The network entity of clause 9, wherein the at least one criterion comprises:
a first time window and one or more location ranges; or
a second time window and a first quantity limit of the waypoints of the portion of the flight path; or
a second quantity limit of the waypoints of the portion of the flight path.

11. The network entity of clause 8, wherein the flight path report message requests the UE to provide the triggered flight path reporting, the flight path report message including at least one criterion for the trigger event.

12. The network entity of clause 11, wherein the at least one criterion for the trigger event comprises a time window for the trigger event to occur, or a threshold separation time between a plurality of trigger events occurring for the UE to report the second flight path information in response to each of the plurality of trigger events, or a combination thereof.

13. The network entity of clause 11, wherein the at least one criterion comprises:
one or more differential distance weighting factors for weighting one or more differences in respective coordinate system values between first waypoints of the previous flight path of the UE and second waypoints of the present flight path of the UE; or
a distance differential threshold for a sum of distance differences between the first waypoints and the second waypoints; or
a time differential threshold for a sum of time differences between the first waypoints and the second waypoints; or
any combination thereof.

14. The network entity of clause 8, wherein the flight path report message requests the UE to provide the differential flight path reporting, and wherein the processor is further configured to:
receive, entity from the UE, the third flight path information; and
at least one of:
store first waypoint information from the third flight path information to a stored flight path based on the third flight path information including the first waypoint information and a first waypoint identity; or
remove second waypoint information from the stored flight path based on the third flight path information indicating to release a second waypoint identity that is present in the stored flight path, the second waypoint information corresponding to the second waypoint identity.

15. A network entity comprising:
means for receiving, from a user equipment (UE), a capability report indicating a capability of the UE to report a flight path of the UE to the network entity; and
means for transmitting, to the UE, a flight path report message that requests the UE to provide:
partial-path flight path reporting by reporting, to the network entity, first flight path information indicative of a portion of the flight path of the UE that is less than all of the flight path; or
triggered flight path reporting by reporting, to the network entity, second flight path information in response to occurrence of a trigger event, the second flight path information indicative of at least some of the flight path of the UE; or
differential flight path reporting by reporting, to the network entity, third flight path information indicative of a difference between a present flight path of the UE and a previous flight path of the UE; or
any combination thereof.
16. The network entity of clause 15, wherein the flight path report message requests the UE to provide the partial-path flight path reporting, the flight path report message including at least one criterion for waypoints of the portion of the flight path.
17. The network entity of clause 16, wherein the at least one criterion comprises:
a first time window and one or more location ranges; or
a second time window and a first quantity limit of the waypoints of the portion of the flight path; or
a second quantity limit of the waypoints of the portion of the flight path.
18. The network entity of clause 15, wherein the flight path report message requests the UE to provide the triggered flight path reporting, the flight path report message including at least one criterion for the trigger event.
19. The network entity of clause 18, wherein the at least one criterion for the trigger event comprises a time window for the trigger event to occur, or a threshold separation time between a plurality of trigger events occurring for the UE to report the second flight path information in response to each of the plurality of trigger events, or a combination thereof.
20. The network entity of clause 18, wherein the at least one criterion comprises:
one or more differential distance weighting factors for weighting one or more differences in respective coordinate system values between first waypoints of the previous flight path of the UE and second waypoints of the present flight path of the UE; or
a distance differential threshold for a sum of distance differences between the first waypoints and the second waypoints; or
a time differential threshold for a sum of time differences between the first waypoints and the second waypoints; or
any combination thereof.
21. The network entity of clause 15, wherein the flight path report message requests the UE to provide the differential flight path reporting, and wherein the network entity further comprises:
means for receiving, from the UE, the third flight path information; and
at least one of:
means for storing first waypoint information from the third flight path information to a stored flight path based on the third flight path information including the first waypoint information and a first waypoint identity; or
means for removing second waypoint information from the stored flight path based on the third flight path information indicating to release a second waypoint identity that is present in the stored flight path, the second waypoint information corresponding to the second waypoint identity.
22. A non-transitory, processor-readable storage medium comprising processor-readable instructions to cause a processor of a network entity to:
receive, from a user equipment (UE), a capability report indicating a capability of the UE to report a flight path of the UE to the network entity; and
transmit, to the UE, a flight path report message that requests the UE to provide:
partial-path flight path reporting by reporting, to the network entity, first flight path information indicative of a portion of the flight path of the UE that is less than all of the flight path; or
triggered flight path reporting by reporting, to the network entity, second flight path information in response to occurrence of a trigger event, the second flight path information indicative of at least some of the flight path of the UE; or
differential flight path reporting by reporting, to the network entity, third flight path information indicative of a difference between a present flight path of the UE and a previous flight path of the UE; or
any combination thereof.
23. The storage medium of clause 22, wherein the flight path report message requests the UE to provide the partial-path flight path reporting, the flight path report message including at least one criterion for waypoints of the portion of the flight path.
24. The storage medium of clause 23, wherein the at least one criterion comprises:
a first time window and one or more location ranges; or
a second time window and a first quantity limit of the waypoints of the portion of the flight path; or
a second quantity limit of the waypoints of the portion of the flight path.
25. The storage medium of clause 22, wherein the flight path report message requests the UE to provide the triggered flight path reporting, the flight path report message including at least one criterion for the trigger event.
26. The storage medium of clause 25, wherein the at least one criterion for the trigger event comprises a time window for the trigger event to occur, or a threshold separation time between a plurality of trigger events occurring for the UE to report the second flight path information in response to each of the plurality of trigger events, or a combination thereof.
27. The storage medium of clause 25, wherein the at least one criterion comprises:
one or more differential distance weighting factors for weighting one or more differences in respective coordinate system values between first waypoints of the previous flight path of the UE and second waypoints of the present flight path of the UE; or
a distance differential threshold for a sum of distance differences between the first waypoints and the second waypoints; or
a time differential threshold for a sum of time differences between the first waypoints and the second waypoints; or
any combination thereof.
28. The storage medium of clause 22, wherein the flight path report message requests the UE to provide the differential flight path reporting, and wherein the storage medium further comprises processor-readable instructions to cause the processor to:
receive, from the UE, the third flight path information; and
at least one of:
store first waypoint information from the third flight path information to a stored flight path based on the third flight path information including the first waypoint information and a first waypoint identity; or
remove second waypoint information from the stored flight path based on the third flight path information indicating to release a second waypoint identity that is present in the stored flight path, the second waypoint information corresponding to the second waypoint identity.

29. A communication method regarding a user equipment flight path, the method comprising:

determining, at a user equipment (UE), a flight path report to provide:

partial-path flight path reporting, wherein the flight path report contains first flight path information indicative of a portion of the flight path of the UE that is less than all of the flight path of the UE; or triggered flight path reporting, wherein the method further comprises determining, at the UE, second flight path information for the flight path report in response to occurrence of a trigger event, the second flight path information indicative of at least some of the flight path of the UE; or differential flight path reporting, wherein the flight path report comprises third flight path information indicative of a difference between a present flight path of the UE and a previous flight path of the UE; or any combination thereof; and transmitting, from the UE to a network entity, the flight path report.

30. The method of clause 29, wherein:
the flight path report provides the partial-path flight path reporting; and
the flight path report includes waypoint information for at least one waypoint of the flight path of the UE that satisfies at least one partial-path criterion.

31. The method of clause 30, wherein the at least one partial-path criterion comprises:
a first time window and one or more location ranges; or
a second time window and a first waypoint quantity limit of the portion of the flight path; or
a second waypoint quantity limit of the portion of the flight path.

32. The method of clause 29, wherein the flight path report provides the triggered flight path reporting, and the method further comprises obtaining, at the UE, at least one event criterion for the trigger event.

33. The method of clause 32, wherein the at least one event criterion for the trigger event comprises a time window for the trigger event to occur, or a threshold separation time between a plurality of trigger events occurring for the UE to report the second flight path information in response to each of the plurality of trigger events, or a combination thereof.

34. The method of clause 32, wherein the at least one event criterion for the trigger event comprises:
one or more differential distance weighting factors for weighting one or more differences in respective coordinate system values between first waypoints of the previous flight path of the UE and second waypoints of the present flight path of the UE; or
a distance differential threshold for a sum of distance differences between the first waypoints and the second waypoints; or
a time differential threshold for a sum of time differences between the first waypoints and the second waypoints; or
any combination thereof.

35. The method of clause 29, wherein the flight path report provides the differential flight path reporting, and wherein the third flight path information comprises waypoint information for at least one waypoint, the waypoint information, for each of the at least one waypoint, comprising a waypoint identity.

36. The method of clause 29, wherein the flight path report includes waypoint information for each of at least one waypoint of the flight path of the UE, and wherein, for each of the at least one waypoint, the waypoint information comprises an indication of an ellipsoid, or an indication of a polygon, or a combination thereof.

37. The method of clause 29, further comprising transmitting, from the UE to the network entity, a capability report indicating a capability of the UE to provide at least one of the partial-path flight path reporting, the triggered flight path reporting, or the differential flight path reporting.

38. A user equipment (UE) comprising:
a transceiver;
a memory; and
a processor communicatively coupled to the transceiver and the memory and configured to:
determine a flight path report to provide:
partial-path flight path reporting, wherein the flight path report contains first flight path information indicative of a portion of the flight path of the UE that is less than all of the flight path of the UE; or
triggered flight path reporting, the processor being configured to determine second flight path information for the flight path report in response to occurrence of a trigger event, the second flight path information indicative of at least some of the flight path of the UE; or
differential flight path reporting, wherein the flight path report comprises third flight path information indicative of a difference between a present flight path of the UE and a previous flight path of the UE; or
any combination thereof; and
transmit, via the transceiver to a network entity, the flight path report.

39. The UE of clause 38, wherein:
the processor is configured to determine the flight path report to provide the partial-path flight path reporting; and
the flight path report includes waypoint information for at least one waypoint of the flight path of the UE that satisfies at least one partial-path criterion.

40. The UE of clause 39, wherein the at least one partial-path criterion comprises:
a first time window and one or more location ranges; or
a second time window and a first waypoint quantity limit of the portion of the flight path; or
a second waypoint quantity limit of the portion of the flight path.

41. The UE of clause 38, wherein the processor is configured to determine the flight path report to provide the triggered flight path reporting, and the processor is further configured to obtain at least one event criterion for the trigger event.

42. The UE of clause 41, wherein the at least one event criterion for the trigger event comprises a time window for the trigger event to occur, or a threshold separation time between a plurality of trigger events occurring for the UE to report the second flight path information in response to each of the plurality of trigger events, or a combination thereof.

43. The UE of clause 41, wherein the at least one event criterion for the trigger event comprises:
one or more differential distance weighting factors for weighting one or more differences in respective coordinate system values between first waypoints of the previous flight path of the UE and second waypoints of the present flight path of the UE; or a distance differential threshold for a sum of distance differences between the first waypoints and the second waypoints; or a time differential threshold for a sum of time differences between the first waypoints and the second waypoints; or any combination thereof.

44. The UE of clause 38, wherein the processor is configured to determine the flight path report to provide the differential flight path reporting, and wherein the third flight path information comprises waypoint information for at least one waypoint, the waypoint information, for each of the at least one waypoint, comprising a waypoint identity.

45. The UE of clause 38, wherein the flight path report includes waypoint information for each of at least one waypoint of the flight path of the UE, and wherein, for each of the at least one waypoint, the waypoint information comprises an indication of an ellipsoid, or an indication of a polygon, or a combination thereof.

46. The UE of clause 38, further comprising means for transmitting, to the network entity, a capability report indicating a capability of the UE to provide at least one of the partial-path flight path reporting, the triggered flight path reporting, or the differential flight path reporting.

47. A user equipment (UE) comprising:
means for determining a flight path report to provide:
partial-path flight path reporting, wherein the flight path report contains first flight path information indicative of a portion of the flight path of the UE that is less than all of the flight path of the UE; or
triggered flight path reporting, wherein the means for determining the flight path report comprise means for determining second flight path information for the flight path report in response to occurrence of a trigger event, the second flight path information indicative of at least some of the flight path of the UE; or
differential flight path reporting, wherein the flight path report comprises third flight path information indicative of a difference between a present flight path of the UE and a previous flight path of the UE; or
any combination thereof and
means for transmitting, to a network entity, the flight path report.

48. The UE of clause 47, wherein:
the means for determining the flight path report comprise means for determining the flight path report to provide the partial-path flight path reporting; and
the flight path report includes waypoint information for at least one waypoint of the flight path of the UE that satisfies at least one partial-path criterion.

49. The UE of clause 48, wherein the at least one partial-path criterion comprises:
a first time window and one or more location ranges; or
a second time window and a first waypoint quantity limit of the portion of the flight path; or
a second waypoint quantity limit of the portion of the flight path.

50. The UE of clause 47, wherein the means for determining the flight path report comprise means for determining the flight path report to provide the triggered flight path reporting, and the UE further comprises means for obtaining at least one event criterion for the trigger event.

51. The UE of clause 50, wherein the at least one event criterion for the trigger event comprises a time window for the trigger event to occur, or a threshold separation time between a plurality of trigger events occurring for the UE to report the second flight path information in response to each of the plurality of trigger events, or a combination thereof.

52. The UE of clause 50, wherein the at least one event criterion for the trigger event comprises:
one or more differential distance weighting factors for weighting one or more differences in respective coordinate system values between first waypoints of the previous flight path of the UE and second waypoints of the present flight path of the UE; or
a distance differential threshold for a sum of distance differences between the first waypoints and the second waypoints; or
a time differential threshold for a sum of time differences between the first waypoints and the second waypoints; or
any combination thereof.

53. The UE of clause 47, wherein the means for determining the flight path report comprise means for determining the flight path report to provide the differential flight path reporting, and wherein the third flight path information comprises waypoint information for at least one waypoint, the waypoint information, for each of the at least one waypoint, comprising a waypoint identity.

54. The UE of clause 47, wherein the flight path report includes waypoint information for each of at least one waypoint of the flight path of the UE, and wherein, for each of the at least one waypoint, the waypoint information comprises an indication of an ellipsoid, or an indication of a polygon, or a combination thereof.

55. The UE of clause 47, wherein the UE further comprises means for transmitting, to the network entity, a capability report indicating a capability of the UE to provide at least one of the partial-path flight path reporting, the triggered flight path reporting, or the differential flight path reporting.

56. A non-transitory, processor-readable storage medium comprising processor-readable instructions to cause a processor of a user equipment (UE) to:
determine a flight path report to provide:
partial-path flight path reporting, wherein the flight path report contains first flight path information indicative of a portion of the flight path of the UE that is less than all of the flight path of the UE; or
triggered flight path reporting, wherein the processor-readable instructions to cause the processor to determine the flight path report comprise processor-readable instructions to cause the processor to determine second flight path information for the flight path report in response to occurrence of a trigger event, the second flight path information indicative of at least some of the flight path of the UE; or
differential flight path reporting, wherein the flight path report comprises third flight path information indicative of a difference between a present flight path of the UE and a previous flight path of the UE; or
any combination thereof; and
transmit, to a network entity, the flight path report.

57. The storage medium of clause 56, wherein:
the processor-readable instructions to cause the processor to determine the flight path report comprise processor-readable instructions to cause the processor to determine the flight path report to provide the partial-path flight path reporting; and
the flight path report includes waypoint information for at least one waypoint of the flight path of the UE that satisfies at least one partial-path criterion.

58. The storage medium of clause 57, wherein the at least one partial-path criterion comprises:
a first time window and one or more location ranges; or
a second time window and a first waypoint quantity limit of the portion of the flight path; or
a second waypoint quantity limit of the portion of the flight path.

59. The storage medium of clause 56, wherein the processor-readable instructions to cause the processor to determine the flight path report comprise processor-readable instructions to cause the processor to determine the flight path report to provide the triggered flight path reporting, and the storage medium further comprises processor-readable instructions to cause the processor to obtain at least one event criterion for the trigger event.

60. The storage medium of clause 59, wherein the at least one event criterion for the trigger event comprises a time window for the trigger event to occur, or a threshold separation time between a plurality of trigger events occurring for the UE to report the second flight path information in response to each of the plurality of trigger events, or a combination thereof.

61. The storage medium of clause 59, wherein the at least one event criterion for the trigger event comprises:
one or more differential distance weighting factors for weighting one or more differences in respective coordinate system values between first waypoints of the previous flight path of the UE and second waypoints of the present flight path of the UE; or
a distance differential threshold for a sum of distance differences between the first waypoints and the second waypoints; or
a time differential threshold for a sum of time differences between the first waypoints and the second waypoints; or
any combination thereof.

62. The storage medium of clause 56, wherein the processor-readable instructions to cause the processor to determine the flight path report comprise processor-readable instructions to cause the processor to determine the flight path report to provide the differential flight path reporting, and wherein the third flight path information comprises waypoint information for at least one waypoint, the waypoint information, for each of the at least one waypoint, comprising a waypoint identity.

63. The storage medium of clause 56, wherein the flight path report includes waypoint information for each of at least one waypoint of the flight path of the UE, and wherein, for each of the at least one waypoint, the waypoint information comprises an indication of an ellipsoid, or an indication of a polygon, or a combination thereof.

64. The storage medium of clause 56, further comprising processor-readable instructions to cause the processor to transmit, to the network entity, a capability report indicating a capability of the UE to provide at least one of the partial-path flight path reporting, the triggered flight path reporting, or the differential flight path reporting.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A communication method regarding a user equipment flight path, the method comprising:
    determining, at a user equipment (UE), a flight path report to provide:
        partial-path flight path reporting, wherein the flight path report contains first flight path information indicative of a portion of the flight path of the UE that is less than all of the flight path of the UE and that corresponds to a region of interest indicated by a request received by the UE; or
        triggered flight path reporting, wherein the method further comprises determining, at the UE, second flight path information for the flight path report in response to occurrence of a trigger event other than a flight path reporting request, the second flight path information indicative of at least some of the flight path of the UE; or
        differential flight path reporting, wherein the flight path report comprises third flight path information indicative of a difference between a present flight path of the UE and a previous flight path of the UE; or
        any combination thereof; and
    transmitting, from the UE to a network entity, the flight path report.

2. The method of claim 1, wherein:
    the flight path report provides the partial-path flight path reporting; and
    the flight path report includes waypoint information for at least one waypoint of the flight path of the UE that satisfies at least one partial-path criterion.

3. The method of claim 2, wherein the at least one partial-path criterion comprises:
    a first time window and one or more location ranges; or
    a second time window and a first waypoint quantity limit of the portion of the flight path; or
    a second waypoint quantity limit of the portion of the flight path.

4. The method of claim 1, wherein the flight path report provides the triggered flight path reporting, and the method further comprises obtaining, at the UE, at least one event criterion for the trigger event.

5. The method of claim 4, wherein the at least one event criterion for the trigger event comprises a time window for the trigger event to occur, or a threshold separation time between a plurality of trigger events occurring for the UE to report the second flight path information in response to each of the plurality of trigger events, or a combination thereof.

6. The method of claim 4, wherein the at least one event criterion for the trigger event comprises:
one or more differential distance weighting factors for weighting one or more differences in respective coordinate system values between first waypoints of the previous flight path of the UE and second waypoints of the present flight path of the UE; or
a distance differential threshold for a sum of distance differences between the first waypoints and the second waypoints; or
a time differential threshold for a sum of time differences between the first waypoints and the second waypoints; or
any combination thereof.

7. The method of claim 1, wherein the flight path report provides the differential flight path reporting, and wherein the third flight path information comprises waypoint information for at least one waypoint, the waypoint information, for each of the at least one waypoint, comprising a waypoint identity.

8. The method of claim 1, wherein the flight path report includes waypoint information for each of at least one waypoint of the flight path of the UE, and wherein, for each of the at least one waypoint, the waypoint information comprises an indication of an ellipsoid, or an indication of a polygon, or a combination thereof.

9. The method of claim 1, further comprising transmitting, from the UE to the network entity, a capability report indicating a capability of the UE to provide at least one of the partial-path flight path reporting, the triggered flight path reporting, or the differential flight path reporting.

10. A user equipment (UE) comprising:
a transceiver;
a memory; and
a processor communicatively coupled to the transceiver and the memory and configured to:
determine a flight path report to provide:
partial-path flight path reporting, wherein the flight path report contains first flight path information indicative of a portion of the flight path of the UE that is less than all of the flight path of the UE and that corresponds to a region of interest indicated by a request received by the UE; or
triggered flight path reporting, the processor being configured to determine second flight path information for the flight path report in response to occurrence of a trigger event other than a flight path reporting request, the second flight path information indicative of at least some of the flight path of the UE; or
differential flight path reporting, wherein the flight path report comprises third flight path information indicative of a difference between a present flight path of the UE and a previous flight path of the UE; or
any combination thereof; and
transmit, via the transceiver to a network entity, the flight path report.

11. The UE of claim 10, wherein:
the processor is configured to determine the flight path report to provide the partial-path flight path reporting; and
the flight path report includes waypoint information for at least one waypoint of the flight path of the UE that satisfies at least one partial-path criterion.

12. The UE of claim 11, wherein the at least one partial-path criterion comprises:
a first time window and one or more location ranges; or
a second time window and a first waypoint quantity limit of the portion of the flight path; or
a second waypoint quantity limit of the portion of the flight path.

13. The UE of claim 10, wherein the processor is configured to determine the flight path report to provide the triggered flight path reporting, and the processor is further configured to obtain at least one event criterion for the trigger event.

14. The UE of claim 13, wherein the at least one event criterion for the trigger event comprises a time window for the trigger event to occur, or a threshold separation time between a plurality of trigger events occurring for the UE to report the second flight path information in response to each of the plurality of trigger events, or a combination thereof.

15. The UE of claim 13, wherein the at least one event criterion for the trigger event comprises:
one or more differential distance weighting factors for weighting one or more differences in respective coordinate system values between first waypoints of the previous flight path of the UE and second waypoints of the present flight path of the UE; or
a distance differential threshold for a sum of distance differences between the first waypoints and the second waypoints; or
a time differential threshold for a sum of time differences between the first waypoints and the second waypoints; or
any combination thereof.

16. The UE of claim 10, wherein the processor is configured to determine the flight path report to provide the differential flight path reporting, and wherein the third flight path information comprises waypoint information for at least one waypoint, the waypoint information, for each of the at least one waypoint, comprising a waypoint identity.

17. The UE of claim 10, wherein the flight path report includes waypoint information for each of at least one waypoint of the flight path of the UE, and wherein, for each of the at least one waypoint, the waypoint information comprises an indication of an ellipsoid, or an indication of a polygon, or a combination thereof.

18. The UE of claim 10, further comprising means for transmitting, to the network entity, a capability report indicating a capability of the UE to provide at least one of the partial-path flight path reporting, the triggered flight path reporting, or the differential flight path reporting.

19. A user equipment (UE) comprising:
means for determining a flight path report to provide:
partial-path flight path reporting, wherein the flight path report contains first flight path information indicative of a portion of the flight path of the UE that is less than all of the flight path of the UE and that corresponds to a region of interest indicated by a request received by the UE; or
triggered flight path reporting, wherein the means for determining the flight path report comprise means for determining second flight path information for the flight path report in response to occurrence of a trigger event other than a flight path reporting request, the second flight path information indicative of at least some of the flight path of the UE; or
differential flight path reporting, wherein the flight path report comprises third flight path information indicative of a difference between a present flight path of the UE and a previous flight path of the UE; or any combination thereof; and means for transmitting, to a network entity, the flight path report.

20. The UE of claim 19, wherein:

the means for determining the flight path report comprise means for determining the flight path report to provide the partial-path flight path reporting; and the flight path report includes waypoint information for at least one waypoint of the flight path of the UE that satisfies at least one partial-path criterion.

21. The UE of claim 19, wherein the means for determining the flight path report comprise means for determining the flight path report to provide the triggered flight path reporting, and the UE further comprises means for obtaining at least one event criterion for the trigger event.

22. A non-transitory, processor-readable storage medium comprising processor-readable instructions to cause a processor of a user equipment (UE) to:

determine a flight path report to provide:

partial-path flight path reporting, wherein the flight path report contains first flight path information indicative of a portion of the flight path of the UE that is less than all of the flight path of the UE and that corresponds to a region of interest indicated by a request received by the UE; or triggered flight path reporting, wherein the processor-readable instructions to cause the processor to determine the flight path report comprise processor-readable instructions to cause the processor to determine second flight path information for the flight path report in response to occurrence of a trigger event other than a flight path reporting request, the second flight path information indicative of at least some of the flight path of the UE; or differential flight path reporting, wherein the flight path report comprises third flight path information indicative of a difference between a present flight path of the UE and a previous flight path of the UE; or any combination thereof; and transmit, to a network entity, the flight path report.

\* \* \* \* \*